United States Patent
Wu

(10) Patent No.: US 10,206,229 B2
(45) Date of Patent: Feb. 12, 2019

(54) DEVICE AND METHOD OF HANDLING RANDOM ACCESS PROCEDURE

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 154 days.

(21) Appl. No.: 15/294,802

(22) Filed: Oct. 17, 2016

(65) Prior Publication Data

US 2017/0111933 A1 Apr. 20, 2017

Related U.S. Application Data

(60) Provisional application No. 62/242,321, filed on Oct. 16, 2015.

(51) Int. Cl.
*H04W 4/00* (2018.01)
*H04W 74/08* (2009.01)
*H04W 74/00* (2009.01)
*H04B 17/318* (2015.01)
*H04W 24/08* (2009.01)
(Continued)

(52) U.S. Cl.
CPC ...... *H04W 74/0833* (2013.01); *H04B 17/318* (2015.01); *H04W 24/08* (2013.01); *H04W 48/10* (2013.01); *H04W 72/042* (2013.01); *H04W 72/0446* (2013.01); *H04W 72/0453* (2013.01); *H04W 74/006* (2013.01); *H04W 74/008* (2013.01)

(58) Field of Classification Search
CPC ............. H04W 74/0833; H04W 48/10; H04W 72/0453; H04W 72/0446; H04W 72/042; H04W 24/08; H04B 17/318

USPC .......................................................... 370/330
See application file for complete search history.

(56) References Cited

U.S. PATENT DOCUMENTS

2008/0075043 A1  3/2008  Wang
2014/0112254 A1  4/2014  Lindoff
(Continued)

FOREIGN PATENT DOCUMENTS

WO   2009055577 A1   4/2009
WO   2014112905 A1   7/2014

OTHER PUBLICATIONS

Search Report dated Mar. 15, 2017 for EP application No. 16194157.0, pp. 1-11.

(Continued)

*Primary Examiner* — Mang Hang Yeung
(74) *Attorney, Agent, or Firm* — Winston Hsu

(57) ABSTRACT

A communication device for handling a random access (RA) procedure comprises a storage unit for storing instructions and a processing circuit coupled to the storage unit. The processing circuit is configured to execute the instructions stored in the storage unit. The instructions comprise performing a first RA procedure to a base station according to a first RA configuration, if the communication device determines that a first condition is satisfied; and performing a second RA procedure to the base station according to a second RA configuration, if the communication device determines that a second condition is satisfied; wherein the first RA configuration corresponds to a first transmission time interval (TTI) length, the second RA configuration corresponds to a second TTI length, and the first TTI length is shorter than the second TTI length.

14 Claims, 6 Drawing Sheets

(51) Int. Cl.
*H04W 48/10* (2009.01)
*H04W 72/04* (2009.01)

(56) References Cited

U.S. PATENT DOCUMENTS

2015/0181624 A1    6/2015  Hwang
2015/0358886 A1*  12/2015  Qin ..................... H04W 36/28
                                                          370/331
2015/0373740 A1*  12/2015  Eriksson ........... H04W 74/0833
                                                          370/329
2016/0262101 A1*   9/2016  Nammi ............. H04W 72/0446

OTHER PUBLICATIONS

3GPP TS 36.300 V12.3.0 (Sep. 2014).
3GPP TS 36.331 V12.3.0 (Sep. 2014).
3GPP TS 36.321 V12.7.0 (Sep. 2015).
3GPP TS 36.213 V12.7.0 (Sep. 2015).
3GPP TS 36.211 V12.7.0 (Sep. 2015).

* cited by examiner

DEVICE AND METHOD OF HANDLING RANDOM ACCESS PROCEDURE

CROSS REFERENCE TO RELATED APPLICATIONS

This application claims the benefit of U.S. Provisional Application No. 62/242,321, filed on Oct. 16, 2015, which is incorporated herein by reference.

BACKGROUND OF THE INVENTION

1. Field of the Invention

The present invention relates to a communication device and a method used in a wireless communication system, and more particularly, to a communication device and a method of handling a random access procedure.

2. Description of the Prior Art

In order to reduce a latency of transmission at a uplink (UL) and/or a downlink (DL) in a long term evolution (LTE) system, a transmission duration is discussed to be reduced in 3rd Generation Partnership Project (3GPP) meetings. However, operation of a random process (RA) procedure is affected by the reduced transmission duration. For example, the UE does not know which transmission duration (e.g., the transmission duration or the reduced transmission duration) is used for performing the RA procedure to the eNB. Thus, how to handle the RA procedure is an important problem to be solved.

SUMMARY OF THE INVENTION

The present invention therefore provides a communication device and a method for handling a random access procedure to solve the abovementioned problem.

A communication device for handling a random access (RA) procedure comprises a storage unit for storing instructions and a processing circuit coupled to the storage unit. The processing circuit is configured to execute the instructions stored in the storage unit. The instructions comprise performing a first RA procedure to a base station according to a first RA configuration, if the communication device determines that a first condition is satisfied; and performing a second RA procedure to the base station according to a second RA configuration, if the communication device determines that a second condition is satisfied; wherein the first RA configuration corresponds to a first transmission time interval (TTI) length, the second RA configuration corresponds to a second TTI length, and the first TTI length is shorter than the second TTI length.

A base station for handling a RA procedure comprises a storage unit for storing instructions and a processing circuit coupled to the storage unit. The processing circuit is configured to execute the instructions stored in the storage unit. The instructions comprise transmitting a first RA configuration for performing a first RA procedure with the base station to at least one communication device; and transmitting a second RA configuration for performing a second RA procedure with the base station to the at least one communication device; wherein the first RA configuration corresponds to a first TTI length, the second RA configuration corresponds to a second TTI length, and the first TTI length is shorter than the second TTI length.

A first base station for handling a RA procedure comprises a storage unit for storing instructions and a processing circuit coupled to the storage unit. The processing circuit is configured to execute the instructions stored in the storage unit. The instructions comprise receiving at least one measurement result of the first base station from a second base station, when a communication device connects to the second base station, wherein the at least one measurement result is transmitted by the communication device to the second base station; determining to comprise a first RA configuration or a second RA configuration for the communication device to access the first base station in a configuration, according to the at least one measurement result, wherein the first RA configuration corresponds to a first TTI length, the second RA configuration corresponds to a second TTI length, and the first TTI length is shorter than the second TTI length; and transmitting the configuration to the second base station, wherein the second base station transmits the configuration to the communication device for connecting to the first base station, and for performing a RA procedure to the first base station according to the first RA configuration or the second RA configuration.

A base station for handling a RA procedure comprises a storage unit for storing instructions and a processing circuit coupled to the storage unit. The processing circuit is configured to execute the instructions stored in the storage unit. The instructions comprise connecting to a communication device via a first cell of the base station; receiving at least one measurement result of a second cell of the base station from the communication device; determining to configure the communication device to connect to the second cell, according to the at least one measurement result; determining to include a first RA configuration or a second RA configuration for the communication device to access the second cell in a message, according to the at least one measurement result, wherein the first RA configuration corresponds to a first TTI length, the second RA configuration corresponds to a second TTI length, and the first TTI length is shorter than the second TTI length; and transmitting the message to the communication device for requesting the communication device to connect to the second cell, and to perform the RA procedure to the second cell according to the first RA configuration or the second RA configuration.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
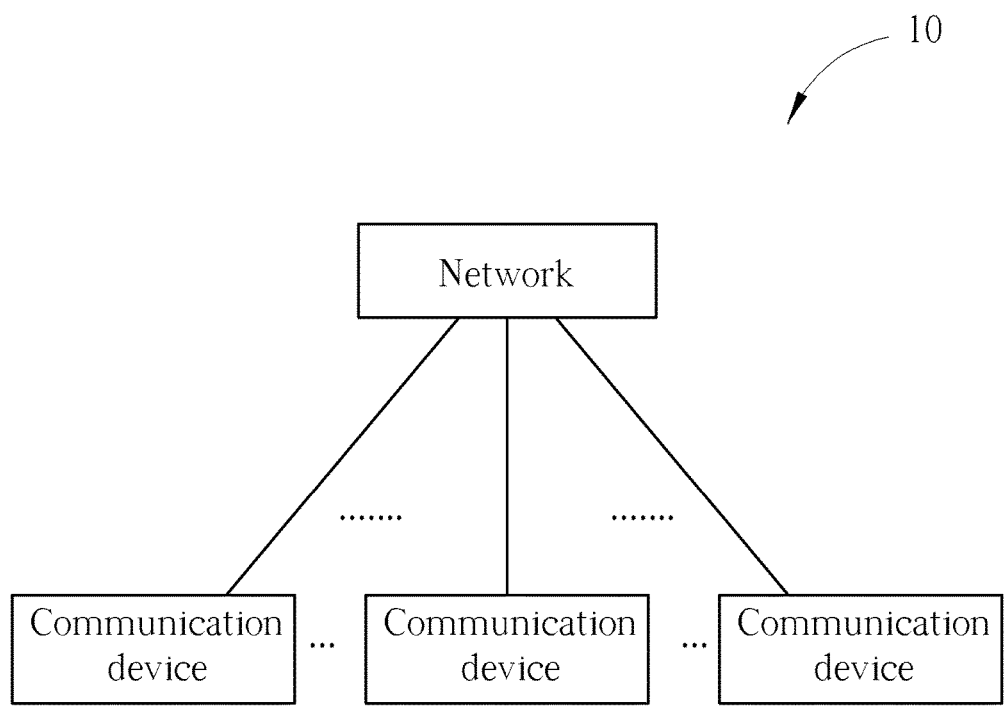
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. In FIG. 1, the network and the communication devices are simply utilized for illustrating the structure of the wireless communication system 10. Practically, the network may be an evolved UTRAN (E-UTRAN) comprising at least one evolved NB (eNB) and/or at least one relay in a long term evolution (LTE) system. In another example, the network may be a fifth generation (5G) network including at least one 5G base station (BS) which employs orthogonal frequency-division multiplexing (OFDM) and/or non-OFDM, and transmission time interval smaller than 1 millisecond (ms) for communication with the communication devices. In general, a BS may also be used to refer any of the eNB and the 5G BS.

A communication device can be a user equipment (UE), a low cost device (e.g., machine type communication (MTC) device), a mobile phone, a laptop, a tablet computer, an electronic book, a portable computer system, a vehicle or aircraft. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
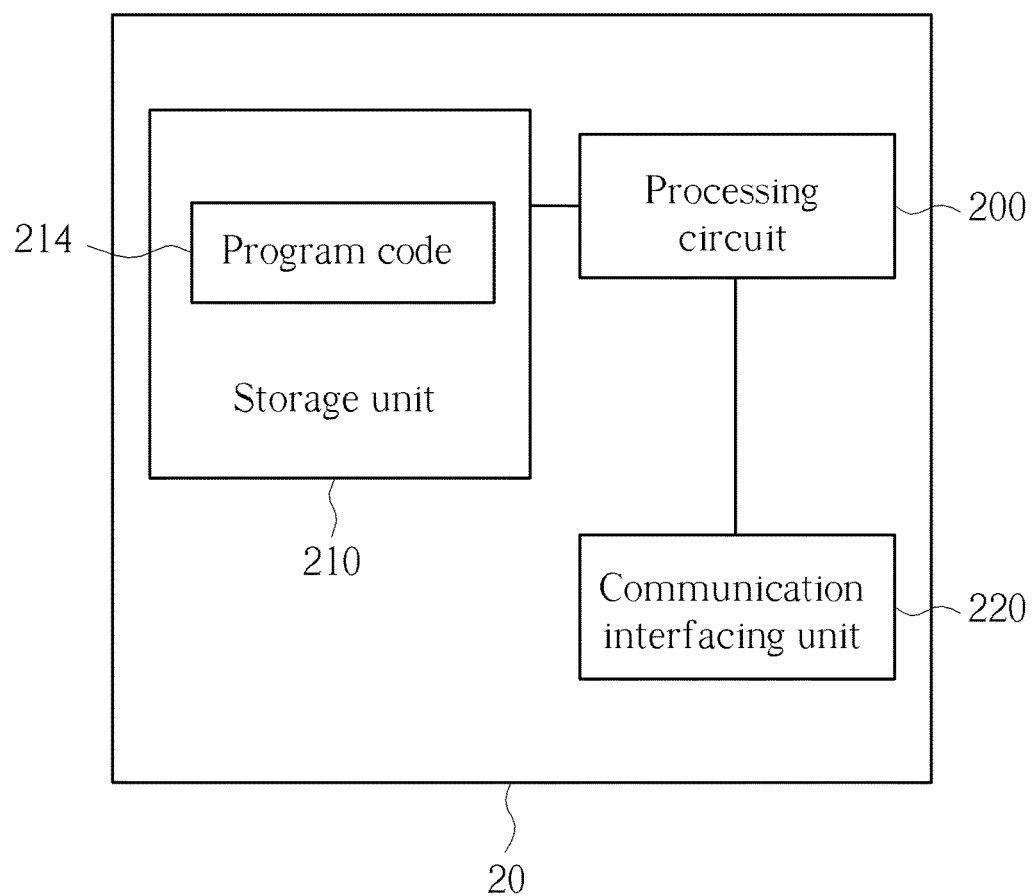
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include a processing circuit 200 such as a microprocessor or Application Specific Integrated Circuit (ASIC), a storage unit 210 and a communication interfacing unit 220. The storage unit 210 may be any data storage device that may store a program code 214, accessed and executed by the processing circuit 200. Examples of the storage unit 210 include but are not limited to a subscriber identity module (SIM), read-only memory (ROM), flash memory, random-access memory (RAM), hard disk, optical data storage device, non-volatile storage unit, non-transitory computer-readable medium (e.g., tangible media), etc. The communication interfacing unit 220 is preferably a transceiver and is used to transmit and receive signals (e.g., data, signals, messages and/or packets) according to processing results of the processing circuit 200.

In the following embodiments, a UE is used to represent a communication device in FIG. 1, to simplify the illustration of the embodiments.

Figure 3:
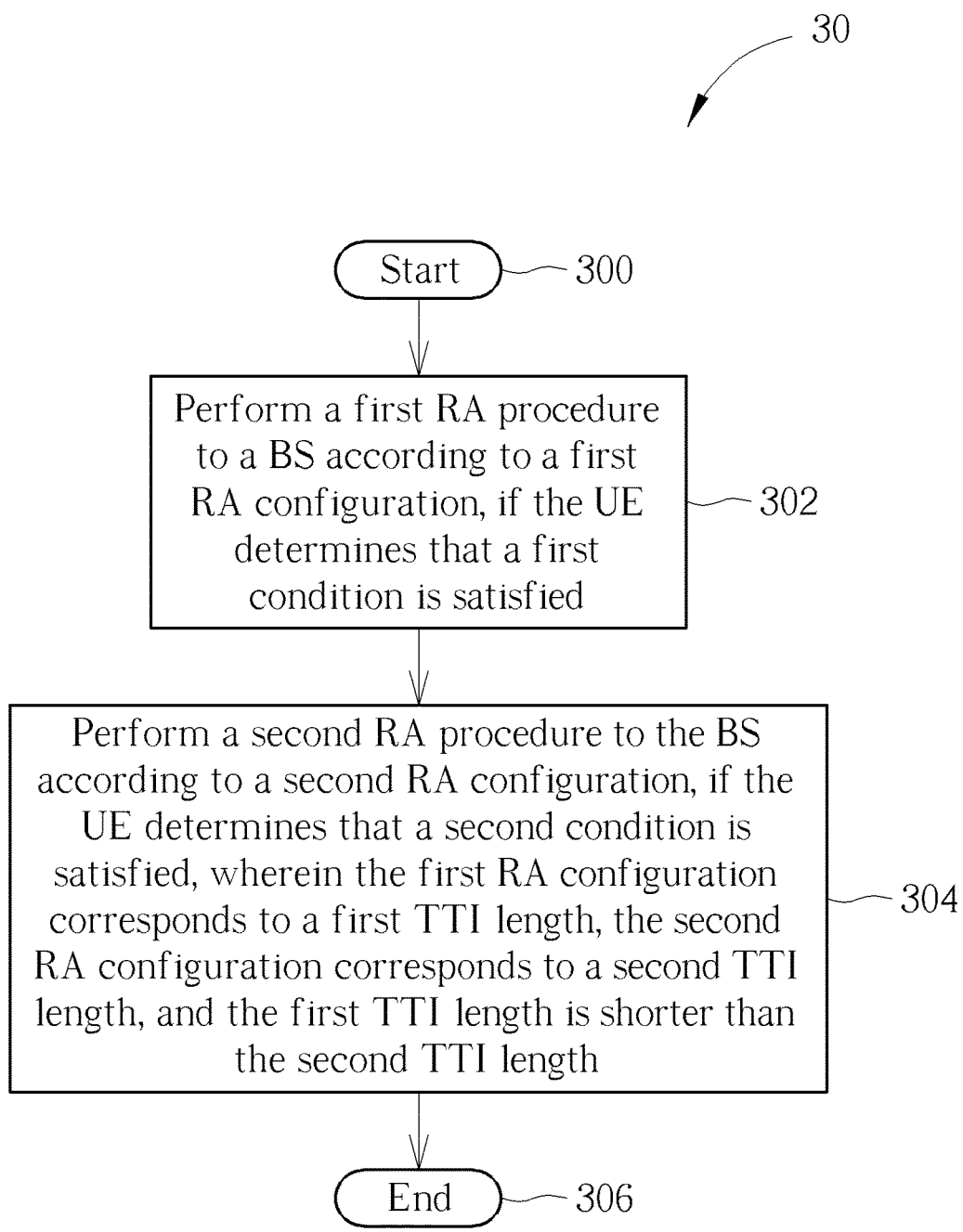
FIG. 3 is a flowchart of a process according to an example of the present invention.

FIG. 3 is a flowchart of a process 30 according to an example of the present invention. The process 30 may be utilized in a UE for handling a random access (RA) procedure. The process 30 includes the following steps:

Step 300: Start.

Step 302: Perform a first RA procedure to a BS according to a first RA configuration, if the UE determines that a first condition is satisfied.

Step 304: Perform a second RA procedure to the BS according to a second RA configuration, if the UE determines that a second condition is satisfied, wherein the first RA configuration corresponds to a first transmission time interval (TTI) length, the second RA configuration corresponds to a second TTI length, and the first TTI length is shorter than the second TTI length.

Step 306: End.

According to the process 30, the UE may perform a first RA procedure to a BS according to a first RA configuration, if the UE determines that a first condition is satisfied. The UE may perform a second RA procedure to the BS according to a second RA configuration, if the UE determines that a second condition is satisfied, wherein the first RA configuration corresponds to a first TTI length, the second RA configuration corresponds to a second TTI length, and the first TTI length is shorter than the second TTI length. That is, the UE may select a RA configuration corresponding to a TTI length to perform a RA procedure to the BS, by determining whether a corresponding condition is satisfied. Thus, the problem of performing the RA procedure is solved according to the process 30.

Realization of the process 30 is not limited to the above description. The following examples may be applied to the process 30.

In one example, the UE may select or may generate a first RA preamble according to the first RA configuration, if the UE determines that the first condition is satisfied. Then, the UE may transmit the first RA preamble to the BS, wherein a duration of the first RA preamble is within the first TTI length. The UE may select or may generate a second RA preamble according to the second RA configuration, if the UE determines that the second condition is satisfied. Then, the UE may transmit the second RA preamble to the BS, wherein a duration of the second RA preamble is within the second TTI length, and the duration of the first RA preamble is shorter than the duration of the second RA preamble. In one example, the first TTI length may be n (e.g., n=1, 2, 3, 4, 5, or 6) OFDM symbols or a time slot (i.e., 0.5 ms), and the second TTI length may be two time slots (i.e., 1 ms or 1 subframe). The duration (e.g., 3.2 OFDM symbols) of the first RA preamble is within 4 OFDM symbols+4 cyclic prefixes (CPs). The duration (e.g., 0.4 ms) of the first RA preamble is within 0.5 ms. The duration (e.g., 0.8 ms) of the second RA preamble is within 1 MS.

In one example, the UE may further receive a first RA response within the first TTI length or a third TTI length, after transmitting the first RA preamble. The UE may receive a second RA response within the second TTI length after transmitting the second RA preamble. The third TTI length may be p (e.g., p=1, 2, 3, 4, 5, or 6) OFDM symbols or a time slot (i.e., 0.5 ms). The first and third TTI lengths are different and shorter than the second TTI length. Further, the UE may monitor a first physical DL control channel (PDCCH) for receiving the first RA response in a first RA response window, and may monitor a second PDCCH for receiving the second RA response in a second RA response window. The first RA response window starts at a TTI containing the first RA preamble plus m (e.g., m=2, 3, or 4) TTIs of the first TTI length. The second RA response window starts at a TTI containing the second RA preamble plus n (e.g., n=2, 3, or 4) TTIs of the second TTI length. A size of the first RA response window is M TTIs and a size of the second RA response window is N TTIs, wherein M and N are positive integers and may be the same or different values. In one example, the M TTIs and the N TTIs may be in which the UE monitors the first PDCCH and the second PDCCH for receiving the first RA response and the second RA response, respectively. In one example, the UE may stop monitoring the first PDCCH for receiving the first RA response after receiving the first RA response, and may stop monitoring the second PDCCH for receiving the second RA response after receiving the second RA response. In one example, the first RA response may include a first RA preamble identifier corresponding to the first RA preamble, and the second RA response may include a second RA preamble identifier corresponding to the second RA preamble.

In one example, the first RA configuration may include a first physical RA channel (PRACH) resource configuration, and the second RA configuration may include a second PRACH resource configuration. The first (second) PRACH resource configuration may indicate at least one of a first (second) time configuration, a first (second) frequency configuration, and a first (second) preamble configuration. The first (second) time configuration may indicate at least one first (second) symbol, a first (second) time slot, and/or a first (second) subframe where the UE transmits the first (second) preamble. The first (second) frequency configuration may indicate a first (second) bandwidth occupied by the first (second) preamble. For example, the first (second) bandwidth may be represented by first (second) number of subcarriers (e.g., 12, 24, 36 or more subcarriers) with a first (second) subcarrier spacing or by first (second) number of resource blocks (RBs) (e.g., 6, 12, 24, or more RBs). The first (second) subcarrier spacing may be configured in the first (second) PRACH resource configuration or fixed. In one example, the first (second) preamble configuration may indicate a length or a duration of a preamble, and/or at least one of a root sequence for generating the preamble and a CP.

For example, the first PRACH resource configuration may indicate a first time resource or a first frequency resource. The UE may transmit the first RA preamble within the first TTI length on the first time or frequency resource. The second PRACH resource configuration may indicate a second time resource or a second frequency resource. The UE may transmit the second RA preamble within the second TTI length on the second time or frequency resource. In one example, the first and the second PRACH resource configurations may be in different time and/or different frequency resources.

In one example, for a TTI length of 1 ms, number of preamble signatures (or called a root sequence) may be 64, and each of the 64 preamble signatures may have a duration of 800 microsecond (us) (i.e., 24576 Ts, wherein Ts is a basic time unit) and be transmitted on a bandwidth of 6 RBs (e.g., 72 subcarriers) with a subcarrier spacing 15 KHz in a frequency domain. Thus, the second preamble may be one of the 64 preamble signatures. The number of preamble signatures may be decreased, if a preamble signature is transmitted on the bandwidth of 6 RBs or on a RA channel occupying 6 RBs, when a short TTI length (e.g., 0.5 ms) is introduced. In one example, for a TTI length of 0.5 ms, the number of preamble signatures may be 32, and each of the 32 preamble signatures may have a duration of 400 us (i.e., 12288 Ts) and be transmitted on the bandwidth of 6 RBs. Thus, the first preamble may be one of the 32 preamble signatures. In another example, for a TTI length including "4 OFDM symbols+4 CPs", the number of preamble signatures may be one of numbers from 10 to 18, and each of those preamble signatures may have a duration of around 200 us (e.g., 3 UL OFDM symbol duration or 228 us). Thus, the first preamble may be one of 10, 11, 12, 13, 14, 15, 16, 17, or 18 preamble signatures. In another example, for a TTI length including "3 OFDM symbols+3 CPs", the number of preamble signatures may be one of numbers from 8 to 16, and each of those preamble signatures may have a duration of around 70 us (e.g., 1 UL OFDM symbol duration or 66.67 us) or around 140 us (i.e., 2 UL OFDM symbol duration or 133.34 us). Thus, the first preamble may be one of 8, 9, 10, 11, 12, 13, 14, 15, or 16 preamble signatures.

Alternatively, each of the 64 preamble signatures may be spanned on more than the bandwidth of 6 RBs (e.g., 72 subcarriers) in the frequency domain, if the number of preamble signatures are kept to be 64, when the short TTI length (e.g., 0.5 ms) is introduced. In one example, for the TTI length of 0.5 ms, the preamble signature may be transmitted on a bandwidth of 12 RBs (i.e., 144 subcarriers), if the number of preamble signatures is 64. In one example, for the TTI length including "4 OFDM symbols+4 CPs", the preamble signature may be transmitted on a bandwidth of 21 RBs (i.e., 252 subcarriers), if the number of preamble signatures is 64. In one example, for the TTI length including "3 OFDM symbols+3 CPs", the preamble signature may be transmitted on a bandwidth of 25 RBs (i.e., 300 subcarriers), if the number of preamble signatures is 64. The number of subcarriers in the above examples may become half to keep the same bandwidth, e.g., "72 subcarriers" is changed to "36 subcarriers", if the subcarrier spacing is changed to 30 KHz.

In one example, the first and second RA configurations may be preconfigured in the UE or be predetermined in 3GPP specification. In one example, the first and second RA configurations may be broadcasted by the BS on a broadcast channel or in system information message(s). Further, the UE may receive the first and second RA configurations on the broadcast channel, before performing the first RA procedure and the second RA procedure. In one example, a first part of the first RA configuration and a second part of the second RA configuration are preconfigured in the UE, and a third part of the first RA configuration and a fourth part of the second RA configuration are broadcasted by the BS. In another example, the first RA configuration may include a first power control configuration, and the second RA configuration may include a second power control configuration.

In one example, the first condition may be that a signal strength or quality of the BS is greater than or equal to a first threshold, and the second condition may be that a signal quality of the BS is lower than or equal to a second threshold. Further, the first and second thresholds may be same or different. In one example, the first and second thresholds may be included in the first and second RA configurations, respectively. In one example, the first and second thresholds may be predetermined, or may be received by the UE from the BS in a broadcast message (e.g., a system information message) or a dedicated message (e.g., a handover command, or a radio resource control (RRC) connection reconfiguration message for configuring a carrier aggregation (CA) or a dual connectivity (DC) to the UE). Thus, The UE may perform a handover procedure according to the first or second RA configuration, when receiving the handover command. The UE may perform a DC procedure according to the first or second RA configuration, when receiving the RRC connection reconfiguration message.

In one example, the first condition may be that a path loss of the BS is lower than or equal to a third threshold, and the second condition may be that a path loss of the BS is greater than or equal to a fourth threshold. The third and fourth threshold may have same or different values.

In one example, the UE may not be able to perform the first RA procedure successfully, when the first condition is satisfied. Then, the UE may perform the second RA procedure to the BS, when the first condition is satisfied and the first RA procedure fails. In one example, the UE may perform the first RA procedure, when the first TTI length is prioritized over the second TTI length.

Figure 4:
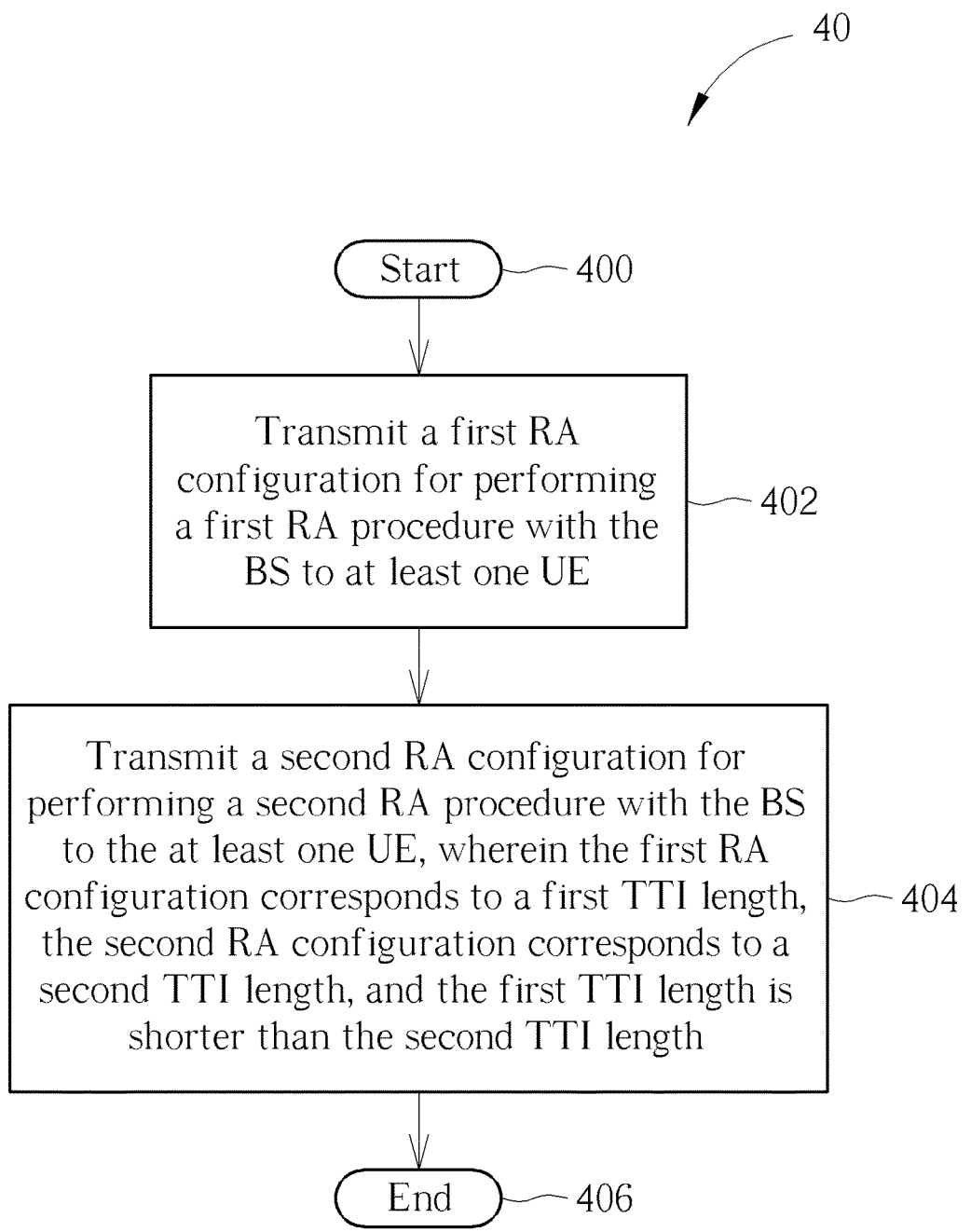
FIG. 4 is a flowchart of a process according to an example of the present invention.

FIG. 4 is a flowchart of a process 40 according to an example of the present invention. The process 40 may be utilized in a BS (e.g., the network in FIG. 1) for handling a RA procedure. The process 40 includes the following steps:

Step 400: Start.

Step 402: Transmit a first RA configuration for performing a first RA procedure with the BS to at least one UE.

Step 404: Transmit a second RA configuration for performing a second RA procedure with the BS to the at least one UE, wherein the first RA configuration corresponds to a first TTI length, the second RA configuration corresponds to a second TTI length, and the first TTI length is shorter than the second TTI length.

Step 406: End.

According to the process 40, the BS may transmit a first RA configuration for performing a first RA procedure with the BS to at least one UE. The BS may transmit a second RA configuration for performing a second RA procedure with the BS to the at least one UE, wherein the first RA configuration corresponds to a first TTI length, the second RA configuration corresponds to a second TTI length, and the first TTI length is shorter than the second TTI length.

Realization of the process 40 is not limited to the above description. The following examples may be applied to the processes 30 and 40.

In one example, the BS may broadcast or transmit at least one parameter for evaluating a first condition and/or a second condition to the at least one UE. The at least one parameter may include at least one of the first, second, third, and fourth thresholds.

In one example, the BS may transmit a first RA response in a first TTI of the first TTI length, when the BS receives a first RA preamble corresponding to the first RA configuration from a first UE of the at least one UE. The BS may transmit a second RA response in a second TTI of the second TTI length, when the BS receives a second RA preamble corresponding to the second RA configuration from a second UE of the at least one UE. In one example, the BS may transmit the first RA response in a time slot, when the first TTI length is 0.5 ms (i.e., a time slot). The BS may transmit the second RA response in a subframe, when the second TTI length is 1 ms (i.e., a subframe), but is not limited herein. For example, the BS may transmit the first RA response in 2, 3, or 4 OFDM symbols, when the first TTI length is 2, 3, or 4 OFDM symbols.

In other words, the BS may know that the first (second) UE uses the first (second) TTI length, when the BS receives the first (second) RA preamble. Then, the BS may transmit the first (second) RA response in the first (second) TTI of the first (second) TTI length. In one example, the BS may transmit a first (second) DL assignment with a cyclic redundancy check (CRC) scrambled by a first (second) RA-radio network temporary identifier (RA-RNTI) in the first (second) TTI to the first (second) UE. The first (second) DL assignment may indicate resources (e.g., RBs) for the first (second) RA response in the frequency domain. The DL assignment may be transmitted on the PDCCH, a short PDCCH (S-PDCCH) or a short enhanced PDCCH (S-EPDCCH). A location of the S-PDCCH in the time or frequency domain may be same or different from a location of the PDCCH. The S-PDCCH may have fewer OFDM symbol (s) than the PDCCH. The S-EPDCCH is different from an EPDCCH, because the EPDCCH is spanned in more than the first TTI length and the S-EPDCCH is spanned in the first TTI length. Alternatively, the BS may transmit the DL assignment in the time resource and the frequency resource which are known by the UE, according to the first (second) RA configuration.

In one example, the BS may configure a PRACH, where the first RA preamble is transmitted, in a first time slot or a second time slot of a subframe, when the short TTI length (e.g., 0.5 ms) is introduced. In addition, a resource of the PRACH may be 6 RBs, and a RA-RNTI value associated with the PRACH is computed according to an equation of RA−RNTI=1+t_id+10×f_id, wherein t_id is an index of the subframe (i.e., subframe number) of the PRACH (0≤t_id<10), and f_id is an index of the PRACH within the subframe, in ascending order of the frequency domain (0≤f_id<6). That is, the first and second RA-RNTI values may be the same, if t_id and f_id are the same for both preambles. The BS may configure different frequency resources (i.e., f_id is different) for the preambles such that the first and second RA-RNTIs have different values.

In another example, a RA-RNTI value associated with the first time slot are computed according to the above equation, and the other RA-RNTI value associated with the second time slot are computed according to the new equation of RA−RNTI=1+t_id+10×f_id+60, wherein t_id is an index of the subframe (i.e., subframe number) of the PRACH (0≤t_id<10), and f_id is an index of the PRACH within the subframe, in ascending order of the frequency domain (0≤f_id<6).

In one example, the BS may configure a PRACH where the first RA preamble is transmitted in a time slot of a subframe, when the short TTI length (e.g., 0.5 ms) is introduced. In addition, a resource of the PRACH may be 12 RBs, and a RA-RNTI value associated with the PRACH is computed according to an equation of RA−RNTI=1+(2×t_id+n)+20×f_id, wherein t_id is an index of the subframe (i.e., subframe number) of the PRACH (0≤t_id<10), n is a time slot number within the subframe (n=0 represents the first time slot of the subframe, n=1 represents the second time slot of the subframe), and f_id is an index of the PRACH within the subframe, in ascending order of the frequency domain (0≤f_id<3). Please note that, (2×t_id+n) with (0≤t_id<10) may be replaced by 0≤ts_id<20, wherein ts_id is a time slot number within a frame.

In one example, the first RA configuration may be transmitted by the BS in a first dedicated message to the first UE, and the second RA configuration may be transmitted by the BS in a second dedicated message to the second UE. The dedicated message (e.g., the first dedicated message or the second dedicated message) may be a handover command or a RRC connection reconfiguration message configuring a CA or a DC.

Figure 5:
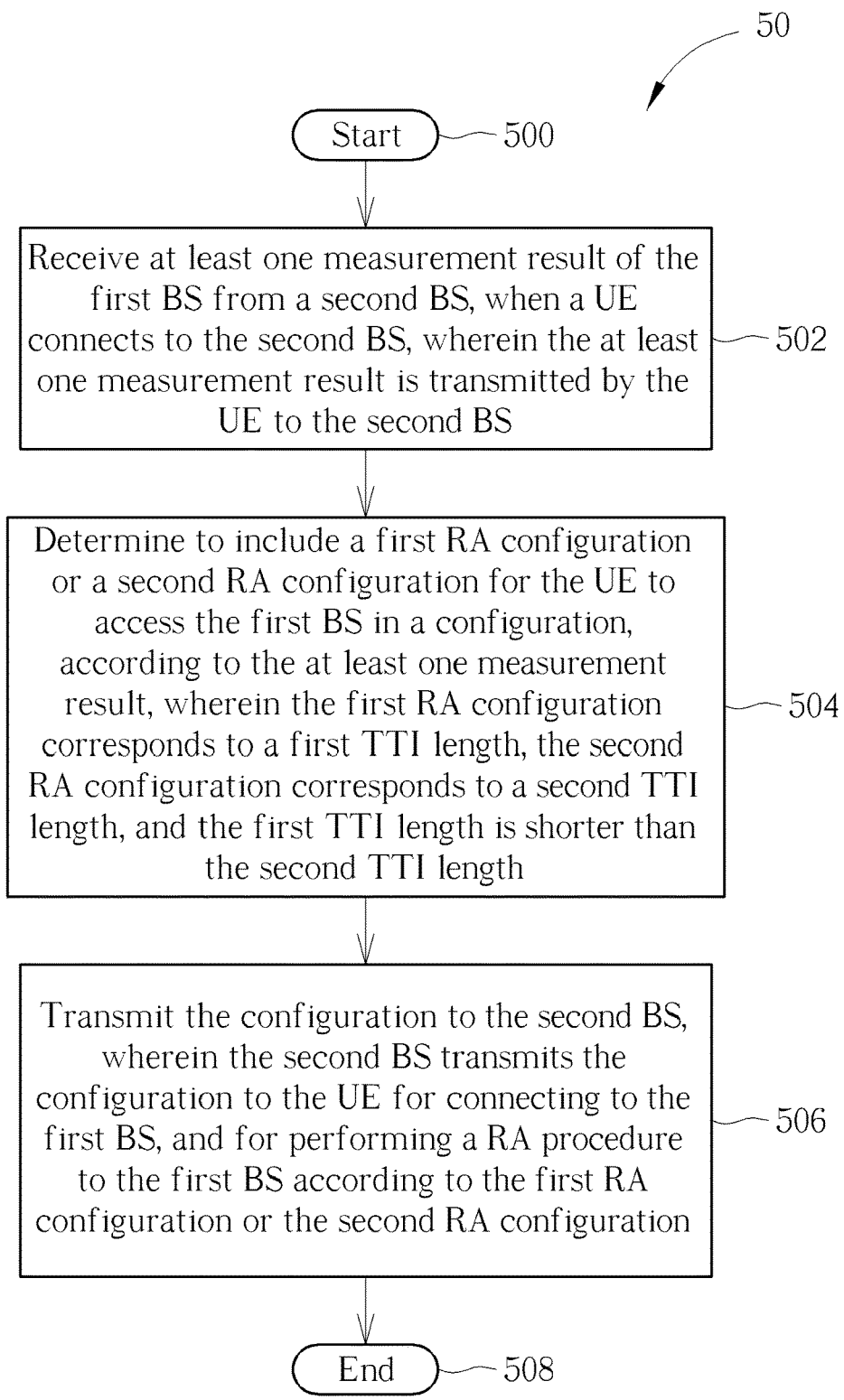
FIG. 5 is a flowchart of a process according to an example of the present invention.

FIG. 5 is a flowchart of a process 50 according to an example of the present invention. The process 50 may be utilized in a first BS (e.g., the network in FIG. 1) for handling a RA procedure. The process 50 includes the following steps:

Step 500: Start.

Step 502: Receive at least one measurement result of the first BS from a second BS, when a UE connects to the second BS, wherein the at least one measurement result is transmitted by the UE to the second BS.

Step 504: Determine to include a first RA configuration or a second RA configuration for the UE to access the first BS in a configuration, according to the at least one measurement result, wherein the first RA configuration corresponds to a first TTI length, the second RA configuration corresponds to a second TTI length, and the first TTI length is shorter than the second TTI length.

Step 506: Transmit the configuration to the second BS, wherein the second BS transmits the configuration to the UE for connecting to the first BS, and for performing a RA procedure to the first BS according to the first RA configuration or the second RA configuration.

Step 508: End.

According to the process 50, the first BS may receive at least one measurement result of the first BS from a second BS, when a UE connects to the second BS, wherein the at least one measurement result is transmitted by the UE to the second BS. Then, the first BS may determine to include a first or second RA configuration for the UE to access the first BS in a configuration, according to the at least one measurement result, wherein the first RA configuration corresponds to a first TTI length, the second RA configuration corresponds to a second TTI length, and the first TTI length is shorter than the second TTI length. The first BS may transmit the configuration to the second BS, wherein the second BS transmits the configuration to the UE for connecting to the first BS, and for performing a RA procedure to the first BS according to the first or second RA configurations.

Realization of the process 50 is not limited to the above description. The following examples may be applied to the process 50.

In one example, the first BS may include the first RA configuration for the UE to access the first BS in the configuration, if a first condition is satisfied according to the at least one measurement result. The first BS may include the second RA configuration for the UE to access the first BS in the configuration, if a second condition is satisfied according to the at least one measurement result. For example, the first condition may be that a signal strength or quality of the first BS is greater than or equal to a first threshold, and the second condition may be that a signal strength or quality of the first BS is lower than or equal to a second threshold. In one example, the first and second thresholds may be predetermined by the first BS.

In one example, the first condition may be that a path loss of the BS is lower than or equal to a third threshold, and the second condition may be that a path loss of the BS is greater than or equal to a fourth threshold. In one example, the configuration may be included in a handover command configuring a handover to the UE or included in a RRC message configuring a DC to the UE.

Figure 6:
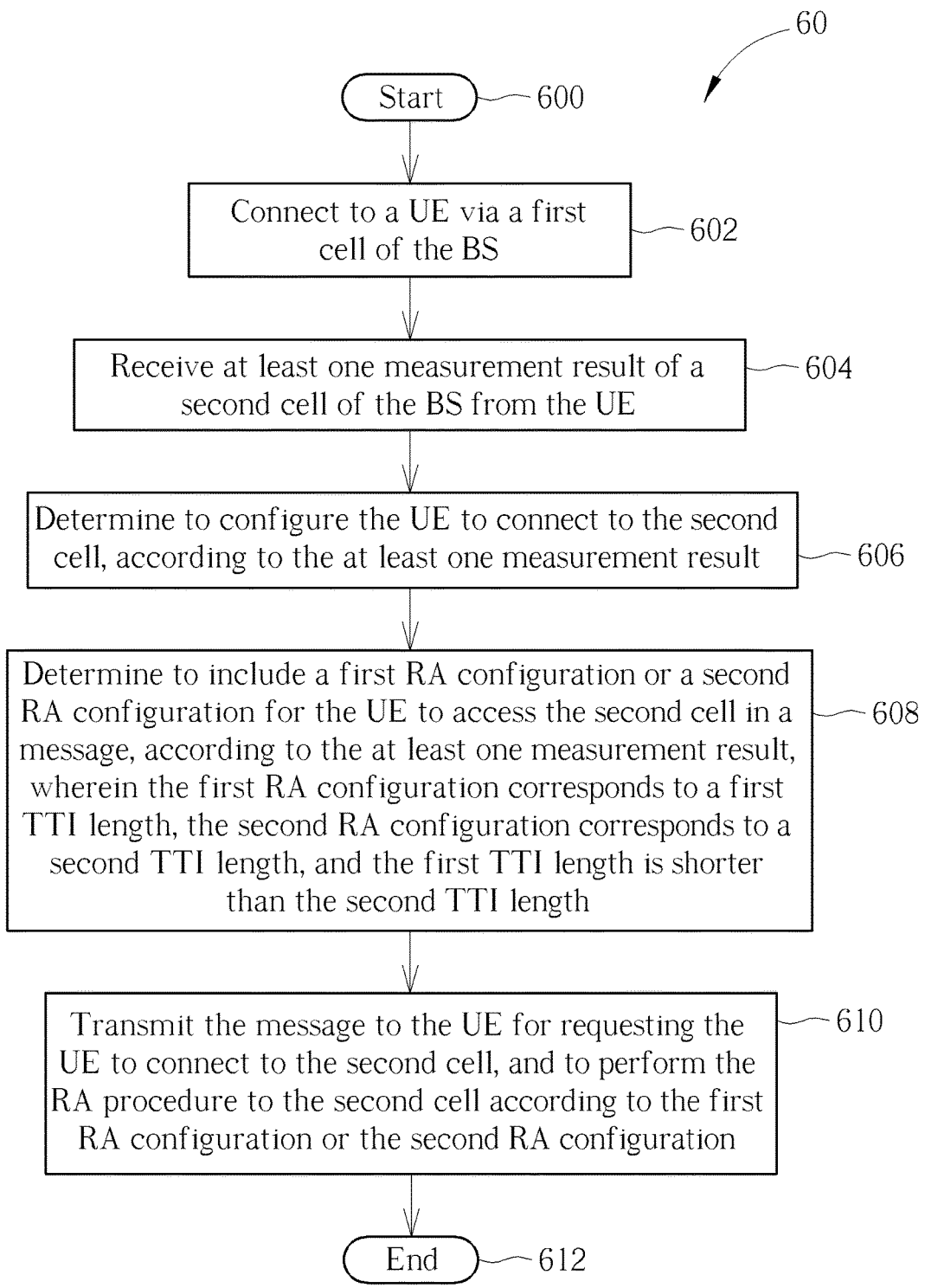
FIG. 6 is a flowchart of a process according to an example of the present invention.

FIG. 6 is a flowchart of a process 60 according to an example of the present invention. The process 60 may be utilized in a BS (e.g., the network in FIG. 1) for handling a RA procedure. The process 60 includes the following steps:

Step 600: Start.

Step 602: Connect to a UE via a first cell of the BS.

Step 604: Receive at least one measurement result of a second cell of the BS from the UE.

Step 606: Determine to configure the UE to connect to the second cell, according to the at least one measurement result.

Step 608: Determine to include a first RA configuration or a second RA configuration for the UE to access the second cell in a message, according to the at least one measurement result, wherein the first RA configuration corresponds to a first TTI length, the second RA configuration corresponds to a second TTI length, and the first TTI length is shorter than the second TTI length.

Step 610: Transmit the message to the UE for requesting the UE to connect to the second cell, and to perform the RA procedure to the second cell according to the first RA configuration or the second RA configuration.

Step 612: End.

According to the process 60, the BS may connect to a UE via a first cell of the BS. Then, the BS may receive at least one measurement result of a second cell of the BS from the UE. The BS may determine to configure the UE to connect to the second cell, according to the at least one measurement result. The BS may determine to include a first or second RA configuration for the UE to access the second cell in a message, according to the at least one measurement result, wherein the first RA configuration corresponds to a first TTI length, the second RA configuration corresponds to a second TTI length, and the first TTI length is shorter than the second TTI length. The BS may transmit the message to the UE for requesting the UE to connect to the second cell, and to perform the RA procedure to the second cell according to the first or second RA configuration.

Realization of the process 60 is not limited to the above description. The following examples may be applied to the process 60.

In one example, the BS may include the first RA configuration for the UE to access the second cell in the message, if a first condition is satisfied according to the at least one measurement result. The BS may include the second RA configuration for the UE to access the second cell in the message, if a second condition is satisfied according to the at least one measurement result. Examples of the first and second conditions are described above and are not repeated here. In one example, the message may be a handover command, or the message may configure a DC to the UE.

Those skilled in the art should readily make combinations, modifications and/or alterations on the abovementioned description and examples. Any of the above mentioned processes may be compiled into the program code 214. The abovementioned description, steps and/or processes including suggested steps can be realized by means that could be hardware, software, firmware, an electronic system, or combination thereof. An example of the means may be the communication device 20.

To sum up, the present invention provides a device and a method for handling a RA procedure. The UE may perform the RA procedure to the BS according to RA configurations transmitted by the BS, wherein the RA configurations correspond to different TTI lengths and one of the TTI lengths is shorter than the other TTI length. A RA configuration with a normal TTI length (e.g., the second TTI length) or a RA configuration with a reduced TTI length (e.g., the first TTI length) is transmitted to the UE, according to the at least one measurement. In other words, a RA procedure between the BS and the UE is performed regularly within a corresponding TTI length according to a corresponding RA configuration. As a result, the problem of performing the RA procedure is solved according to the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for handling a random access (RA) procedure, comprising:
   a storage device, for storing instructions of:
   performing a first RA procedure to a base station according to a first RA configuration, responsive to determining that the communication device determines that a first condition is satisfied; and
   performing a second RA procedure to the base station according to a second RA configuration, responsive to determining that the communication device determines that a second condition is satisfied;
   wherein the first RA configuration corresponds to a first transmission time interval (TTI) length, the second RA configuration corresponds to a second TTI length, and the first TTI length is shorter than the second TTI length;

wherein the storage device further stores instructions of:
selecting or generating a first RA preamble according to the first RA configuration, responsive to determining that the communication device determines that the first condition is satisfied;
transmitting the first RA preamble to the base station within the first TTI length;
selecting or generating a second RA preamble according to the second RA configuration, responsive to determining that the communication device determines that the second condition is satisfied; and
transmitting the second RA preamble to the base station within the second TTI length;
wherein a duration of the first RA preamble is shorter than a duration of the second RA preamble;
receiving a first RA response within the first TTI length, after transmitting the first RA preamble; and
receiving a second RA response within the second TTI length, after transmitting the second RA preamble; and
a processing circuit, coupled to the storage device, configured to execute the instructions stored in the storage device.

2. The communication device of claim 1, wherein the storage device further stores instructions of:
monitoring a first physical downlink control channel (PDCCH) for receiving the first RA response in a first RA response window; and
monitoring a second PDCCH for receiving the second RA response in a second RA response window.

3. The communication device of claim 1, wherein the first RA response comprises a first RA preamble identifier corresponding to the first RA preamble, and the second RA response comprises a second RA preamble identifier corresponding to the second RA preamble.

4. The communication device of claim 1, wherein the first RA configuration comprises a first physical RA channel (PRACH) resource configuration, and the second RA configuration comprises a second PRACH resource configuration; and the first PRACH resource configuration or the second PRACH resource configuration indicates at least one of a time configuration, a frequency configuration, and/or a preamble configuration.

5. The communication device of claim 4, wherein the first PRACH resource configuration and the second PRACH resource configuration are in different time resources and/or different frequency resources.

6. The communication device of claim 1, wherein the communication device receives the first RA configuration and the second RA configuration on a broadcast channel or in a dedicated message, before performing the first RA procedure and the second RA procedure.

7. The communication device of claim 1, wherein the first condition is that a signal strength or quality of the base station is greater than or equal to a first threshold, and the second condition is that a signal strength or quality of the base station is lower than or equal to a second threshold.

8. A base station for handling a random access (RA) procedure, comprising:
a storage device, for storing instructions of:
transmitting a first RA configuration for performing a first RA procedure with the base station to at least one communication device; and
transmitting a second RA configuration for performing a second RA procedure with the base station to the at least one communication device;
wherein the first RA configuration corresponds to a first transmission time interval (TTI) length, the second RA configuration corresponds to a second TTI length, and the first TTI length is shorter than the second TTI length;
wherein the storage device further stores instructions of:
transmitting a first RA response in a first TTI of the first TTI length, when receiving the first RA preamble; and
transmitting a second RA response in a second TTI of the second TTI length, when receiving the second RA preamble; and
a processing circuit, coupled to the storage device, configured to execute the instructions stored in the storage device.

9. The base station of claim 8, wherein the first RA configuration comprises a first physical RA channel (PRACH) resource configuration, and the second RA configuration comprises a second PRACH resource configuration; and the first PRACH resource configuration or the second PRACH resource configuration indicates at least one of a time configuration, a frequency configuration, and/or a preamble configuration.

10. The base station of claim 8, wherein the first RA configuration and the second RA configuration are broadcasted by the base station on a broadcast channel.

11. The base station of claim 8, wherein the storage device further stores an instruction of:
transmitting at least one parameter for evaluating a first condition and/or a second condition to the at least one communication device;
wherein the first condition is that a signal strength or quality of the base station is greater than or equal to a first threshold, and the second condition is that a signal strength or quality of the base station is lower than or equal to a second threshold; or the first condition is that a path loss of the base station is lower than or equal to a third threshold, and the second condition is that a path loss of the base station is greater than or equal to a fourth threshold.

12. A first base station for handling a random access (RA) procedure, comprising:
a storage device, for storing instructions of:
receiving at least one measurement result of the first base station from a second base station, when a communication device connects to the second base station, wherein the at least one measurement result is transmitted by the communication device to the second base station;
determining to comprise a first RA configuration or a second RA configuration for the communication device to access the first base station in a configuration, according to the at least one measurement result, wherein the first RA configuration corresponds to a first transmission time interval (TTI) length, the second RA configuration corresponds to a second TTI length, and the first TTI length is shorter than the second TTI length; and
transmitting the configuration to the second base station, wherein the second base station transmits the configuration to the communication device for connecting to the first base station, and for performing a RA procedure to the first base station according to the first RA configuration or the second RA configuration; and
a processing circuit, coupled to the storage device, configured to execute the instructions stored in the storage device.

13. The base station of claim 12, wherein the instruction of determining to comprise the first RA configuration or the second RA configuration for the communication device to access the base station in the configuration according to the at least one measurement result, comprises:
- comprising the first RA configuration for the communication device to access the first base station in the configuration, responsive to determining that a first condition is satisfied according to the at least one measurement result; and
- comprising the second RA configuration for the communication device to access the first base station in the configuration, responsive to determining that a second condition is satisfied according to the at least one measurement result.

14. The base station of claim 13, wherein the first condition is that a signal strength or quality of the base station is greater than or equal to a first threshold, and the second condition is that a signal strength or quality of the base station is lower than or equal to a second threshold; or the first condition is that a path loss of the base station is lower than or equal to a third threshold, and the second condition is that a path loss of the base station is greater than or equal to a fourth threshold.

* * * * *